United States Patent [19]

Ehrsam

[11] Patent Number: 4,749,394

[45] Date of Patent: Jun. 7, 1988

[54] METHOD AND APPARATUS FOR FREEZE DRYING

[75] Inventor: Christian Ehrsam, Winterthur, Switzerland

[73] Assignee: Sulzer Brothers Limited, Winterthur, Switzerland

[21] Appl. No.: 83,676

[22] Filed: Aug. 7, 1987

[30] Foreign Application Priority Data

Aug. 27, 1986 [CH] Switzerland .................. 3446/86

[51] Int. Cl.[4] ............................ B01D 9/04; C02F 1/22
[52] U.S. Cl. ............................................ 62/532; 62/123
[58] Field of Search ............... 62/123, 532, 537, 541

[56] References Cited

U.S. PATENT DOCUMENTS

4,003,213 1/1977 Cox ............................ 62/124
4,474,031 10/1984 Collet ............................ 62/536

Primary Examiner—Ronald C. Capossela
Attorney, Agent, or Firm—Kenyon & Kenyon

[57] ABSTRACT

Ethanol is admixed with a compressed vapor in an ice generator, and the mixture is then condensed by indirect heat exchange with a coolant in a chamber. The condensate is collected in a bottom chamber of the ice generator and then supplied to a scraper heat exchanger where primary ice crystals are generated. The ethanol is washed out of the ice crystal suspension in a counter-flow washer and the primary ice crystal suspension delivered to a freeze drying chamber where the secondary ice crystal suspension is then generated to form the end product. This method permits the continuous generation of crystalline ice without interruptions for defrosting.

18 Claims, 5 Drawing Sheets

METHOD AND APPARATUS FOR FREEZE DRYING

This invention relates to a method and apparatus for freeze drying. More particularly, this invention is directed to a method and apparatus for generating an ice crystal suspension by freeze drying.

As is known, the formation of ice by freeze drying relies on a process which occurs at the triple point of water. One condition of this process is that the vapor pressure is lowered to below the saturation pressure at the triple point.

The motive power to convey the vapor released during ice formation can be generated in several ways. For example, the vapor may be drawn off by a compressor such as a mechanical compressor or a vapor jet compressor with the compressed vapor then being liquified in a condenser. Alternatively, the uncompressed water vapor may be deposited on surfaces which have been cooled to temperatures below the equilibrium temperature at the triple point. In this case, desublimation occurs, that is, the water vapor deposited occurs in the form of ice.

U.S. Pat. No. 4,474,031 describes a heat pump plant in which ice is generated in a vacuum vessel by desublimation of uncompressed water vapor. However, a serious disadvantage of the technique used is that the ice formed during desublimation must be melted off by periodic defrosting.

U.S Pat. No. 4,003,213 describes a method of generating ice by freeze drying at the triple point wherein the vapor which occurs is compressed and condensed at a temperature above the triple point by heat exchange, for example, with ambient air. A similar method is described in the book "Principles of Desalination" by K. S. Spiegler, ed., (New York, 1966, Academic Press) in Chapter 7, "Freezing Methods" by A. E. Snyder. In this case, the method of desalination of sea water uses a pre-cooler in which ice crystal seeds are to form in order to later serve in the process of generating ice crystals by crystal growth. Condensation of the vapor which arises and the subsequent compression is also performed at a temperature above the triple point, at a temperature of approximately 3° C. at which no problems arise from ice formation on the surface of the condensor.

However, serious disadvantages of the latter two methods arise in that expensive compressors are required as a result of the large volume flows and relatively high compression ratios, for example, in excess of 1.3 which are used.

Accordingly, it is an object of the invention to provide for the continuous production of ice crystal suspensions which do not involve ice formation by desublimation.

It is another object of the invention to produce ice crystal suspensions at very low compression ratios.

It is another object of the invention to preserve continuity without interruptions for defrosting in the generation of ice crystal suspensions.

Briefly, the invention provides a method and apparatus for generating an ice crystal suspension without desublimation.

In accordance with the method, a flow of a mixture of water vapor and a water-soluble additive having a lower boiling point than water and which effects a reduction in the vapor pressure of an aqueous solution thereof at the triple point relative to the triple point of water is first compressed. Next, the mixture is cooled in indirect heat exchange relation with a flow of coolant to continuously condense the mixture to form a condensate. Thereafter, a partial freezing of the condensate occurs to form a primary ice crystal suspension while additive is separated therefrom. Next, the primary ice crystal suspension is subjected to freeze drying in order to form a secondary ice suspension for processing into a product.

The apparatus includes at least one compressor for delivering a mixture of compressed water vapor and a water soluble additive into a drying chamber and a second or condensation chamber having heat transfer surfaces for receiving the compressed flow in indirect heat exchange relation with a flow of coolant in order to condense the mixture. In addition, a third chamber is connected to the condensation chamber to collect condensate from the heat transfer surfaces. A means such as a scraper heat exchanger is also connected in series with this third chamber for receiving the condensate and generating primary ice crystals from the condensate.

The drying chamber of the apparatus also receives and freeze dries the primary ice crystals in heat exchange with the compressed flow in order to generate an ice crystal suspension therefrom.

The apparatus also includes a separator connected to an outlet of the third chamber in order to separate condensate from the ice crystal suspension. This separator is also connected to a counterflow washer and a vapor generator. The counterflow washer communicates with the separator in order to receive a flow of ice crystal suspension and has an upper end communicating with the drying chamber of the apparatus in order to deliver a flow primary ice crystals thereto. The vapor generator communicates with the separator in order to receive and evaporate a flow of additive containing condensate and communications with the compressor in order to deliver a flow of additive-containing water vapor thereto.

A suitable supply duct may communicate the scraper heat exchanger with an inlet to the third chamber in order to convey a flow of ice crystal suspension into the third chamber. In addition, the scraper heat exchanger may be disposed in a bottom end of the counterflow washer.

These and other objects and advantages of the invention will become more apparent from the following detailed description taken in conjunction with the accompanying drawings wherein:

Figure 1A:
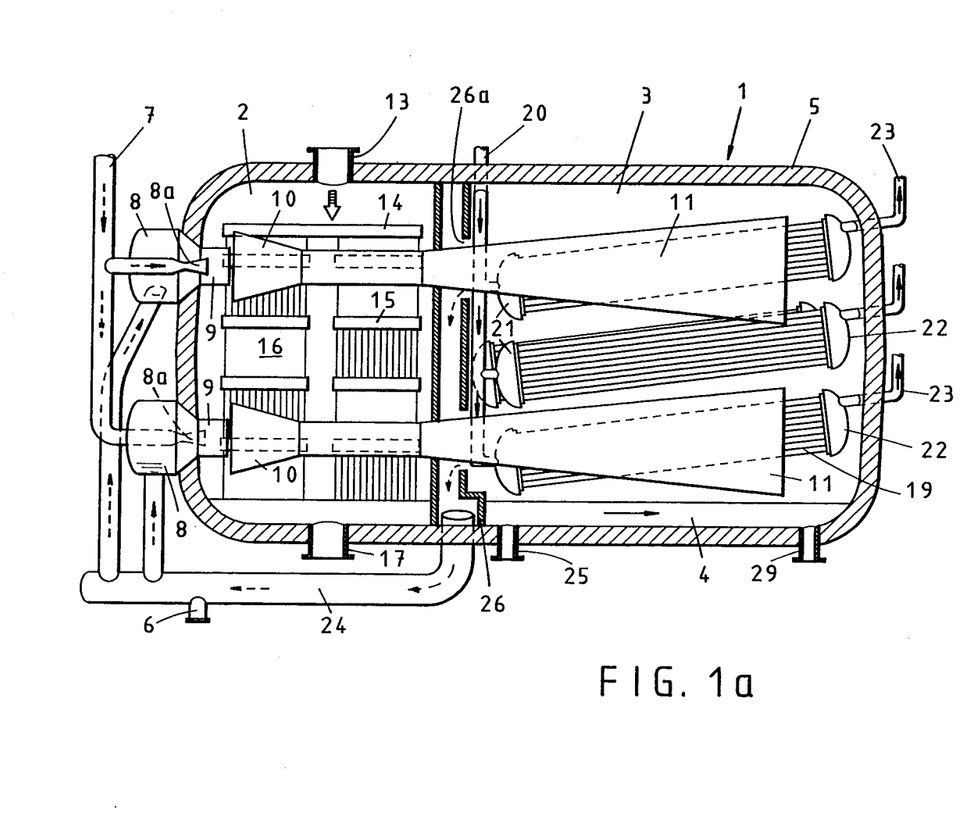
FIG. 1a diagrammatically illustrates a cross sectional view through an apparatus constructed in accordance with the invention.

Referring to FIG. 1a, the apparatus for generating an ice crystal suspension is in the form of an ice generating plant 1 (hereinafter "ice generator") which includes three chambers 2, 3, 4 enclosed in a pressure-resistant casing 5.

As illustrated, two of the chambers 2, 3 are disposed horizontally beside one another and the third chamber is disposed below the second chamber.

The first chamber 2 functions as a freeze drying chamber, the second chamber 3 functions as a condensation chamber and the third chamber 4 functions as a collection or bottom chamber.

The ice generator 1 is under vacuum and, to this end, is connected to a vacuum pump (not shown) by a suction duct 6.

The ice generator 1 also includes a propelling vapor duct 7 which is connected in parallel to two nozzle chambers 8 of two vapor jet compressors which extend into the drying chamber 2. Each nozzle chamber 8, in turn, is connected to a first mixing chamber 9 which, in turn, is connected to a second mixing chamber 10 which communicates with a diffuser 11 in the condensation chamber 3. Alternatively, only one vapor jet compressor may be used or more than two may be used.

As illustrated in FIG. 1a, the duct 7 serves to deliver a vapor mixture into each compressor 8 via a propelling nozzle 8a within the first mixing chamber 9. Further, each mixing chamber 10 opens to the interior of the drying chamber 2 for receiving a flow of water vapor from the drying chamber 2 for mixing with the vapor delivered through the duct 7.

Figure 1B:
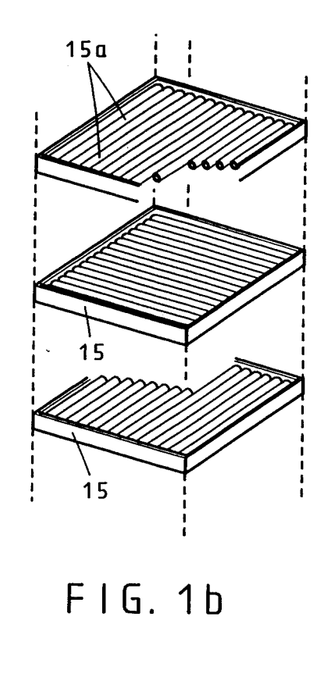
FIG. 1b illustrates an exploded view of a films forming grill used in a drying chamber of the apparatus of FIG. 1.

An inlet spigot 13 is disposed in the casing 5 in order to deliver an ice crystal suspension into the freeze drying chamber 2 while a distributor 14 is located below the spigot 13 for distributing the delivered ice crystal suspension onto and over a plurality of grilles 15. As indicated, the grilles 15 are vertically disposed within the drying chamber 2 and are constructed, for example, of synthetic plastic tubes 15a so that the delivered ice crystal suspension may fall freely in the form of sheets 16 over the respective tubes. An outlet spigot 17 is provided in the bottom of the casing 5 within the drying chamber 2 for the outflow of the ice crystal suspension after freeze drying.

The condensation chamber 3 houses a plurality of condenser/evaporator units. Each unit is comprised of a plurality of tubes 19 which are connected in banks between a coolant distributor 21 and a coolant collector 22. As indicated, the tubes 19 rise gently in the direction of flow so that the buoyancy of the vapor bubbles therein can be exploited to assist the flow of coolant. The distributors 21 are connected in common to an inlet union 20 while the collectors 22 are each connected to a respective outlet unit 23.

The chambers 2, 3 are separated by a hollow partition 26 which contains apertures 26a on the condenser chamber side so that water vapor and additive from the condensation chamber 3 can be drawn into the partition 26. As indicated, the interior of the partition 26 is connected to a return duct 24 which communicates with the compressors 8.

A union 25 is connected to the bottom chamber 4 in order to supply a primary ice suspension at one end while an outlet union 29 is provided at the opposite end of the chamber 4 for the delivery of an ice suspension and condensate.

Figure 2:
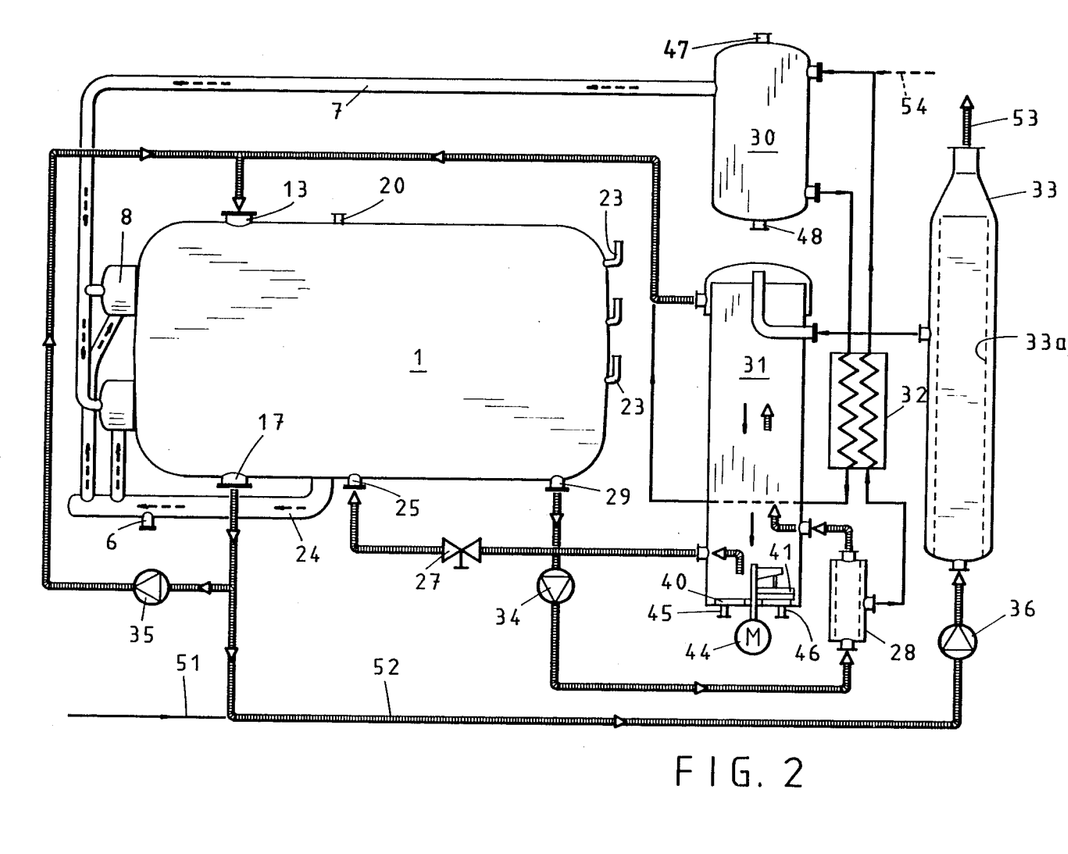
FIG. 2 schematically illustrates a vapor/water/ice circulation circuit in accordance with the invention.

Referring to FIG. 2, the plant includes a vapor/water/ice circulation circuit. In this respect, the associated coolant circuit is not shown except for the connections for coolant at the corresponding points in the product circuit.

As illustrated in FIG. 2, the product circuit includes a separator 28, a vapor generator 30, a counter flow washer 31 for primary ice, a counterflow heat exchanger 32 and dewatering unit 33 with a tubular screen 33a. The product circuit also includes a pump 34 for the primary ice suspension located in a duct between the outlet union 29 and the separator 28. In addition, the circuit includes a circulation pump 35 for a secondary ice suspension which is connected in a duct which communicates with a discharge duct 52 from the outlet spigot 17 of the freeze drying chamber (not shown) and with the feed duct which communicates with the inlet spigot 13 to the freeze drying chamber (not shown). Still further, a product pump 36 is connected in the discharge line 52 from the outlet spigot 17 in order to deliver a secondary ice suspension to the dewatering unit 33. A control valve 27 is also disposed in a delivery duct between the counterflow washer 31 and the inlet union 25 to the bottom chamber (not shown) of the ice generator 1.

A means in the form of a scraper heat exchanger 40–43 is connected in series with the bottom chamber (not shown) of the ice generator 1 for receiving condensate therefrom and for generating primary ice crystals from the condensate. As indicated, the scraper heat exchanger 40–43 is disposed in a bottom end of the counterflow washer 31.

In operation, water vapor which arises during freeze drying in the drying chamber 2 is delivered into the mixing chambers 10 and is mixed with the water vapor and a water soluble additive entering from the duct 7. In this respect, the additive has a lower boiling point than water and effects a reduction in the vapor pressure of the aqueous solution at the triple point relative to the triple point of pure water. For example, the additive may be ethanol.

The resulting compressed mixture is then passed through the diffusers 11 into the condensation chamber 3 and over the tubes 19 through which coolant flows. The compressed mixture is thus cooled so as to continuously condense the mixture to form a condensate.

During operation, the vapor pressure in the drying chamber 2 is advantageously as high as possible, for example about 5.8 mbar, on the surface of the freeze drying ice crystal suspension. In this respect, a relatively low pressure ratio of, for example, about 1.1 is maintained between the drying chamber 2 and the condensation chamber 3, particularly when handling large volume flows. This has a favorable effect on the compression power. Accordingly, vapor jet compressors can be used to advantage since the entire ice generating plant can then be constructed as a single unit without mechanically moved parts. Alternatively, axial or radial compressors may also be used.

While in the condensation chamber 3, the delivered vapor mixture is partially condensed on the tubes 19 by indirect heat exchange with the evaporating coolant which is circulated through the tubes 19 and delivered by the ducts 23 to the suction side of a refrigerator (not shown). Water vapor within the condensation chamber 3 which is enriched with ethanol is fed through the openings 26a into the interior of the hollow partition 26 and fed along the duct 24 to the vapor jet compressors.

Vapor condensation occurs in the chamber 3 in such a way that no ice forms on the condenser tubes 19.

Thus, defrosting cycles are not required and the ice generator 1 can be run continuously without complicated changeovers. In addition, there are no energy losses associated with defrosting.

The motive power to carry the vapor escaping during ice formation in the chamber 2 to the condenser tubes 19 is generated partly by vapor compression and partly by the temperature drop from chamber 2 to chamber 3. The contribution of the temperature drop to the motive power is limited, as no ice is to form on the condenser tubes 19. By adding more additive, such as ethanol, this second contribution can be increased.

Once the condensation temperature exceeds the triple point temperature, which depends on the ethanol content, there is no risk of ice formation.

The condensation process may also, however, be induced below the triple point, that is, with supercooled condensate. The supercooling, expressed as the difference between the triple point temperature and the condensate temperature, most not however exceed a critical value, for example, 3K. This critical value depends on the surface properties of the condenser tubes, and also on how much the condenser tubes vibrate under disturbing influences.

In the first case, there is no need for the inlet union 25 and the supply duct with the valve 27, or for the separator 28, that is, they can be omitted. These components are need only in the second case.

Since the compression ratio of chamber 3 to chamber 2 is to be as low as possible, for example, 1.1, the necessary motive power for vapor transport can be generated only by sufficiently lowering the condensation temperature. If this temperature is not to fall below the triple point, the quantity of additive is predetermined.

As it is desirable to reduce the additive requirement, partly for reasons of cost, but mainly in order to produce as pure an end product as possible, condensation of the vapor mixture is preferrably performed in the supercooled range. In this case, however, there is a risk in chamber 3 that the condensate dripping from the condenser tubes 19 might, on hitting the wall of the bottom chamber 4, form ice due to its supercooling.

For this reason, an ice crystal suspension is fed to the bottom chamber 4 through the inlet union 25. As the supercooled condensate mixes with the ice crystal suspension, the supercooling is reduced, the heat required for this purpose being supplied by the growing ice crystals.

The ice crystal suspension fed to the bottom chamber 4 is produced separately from the ice formed by freeze drying in the chamber 2. This ice is termed primary ice, because, instead of being obtained by crystal growth from existing ice crystals, it requires the formation of new crystals.

Figure 4:
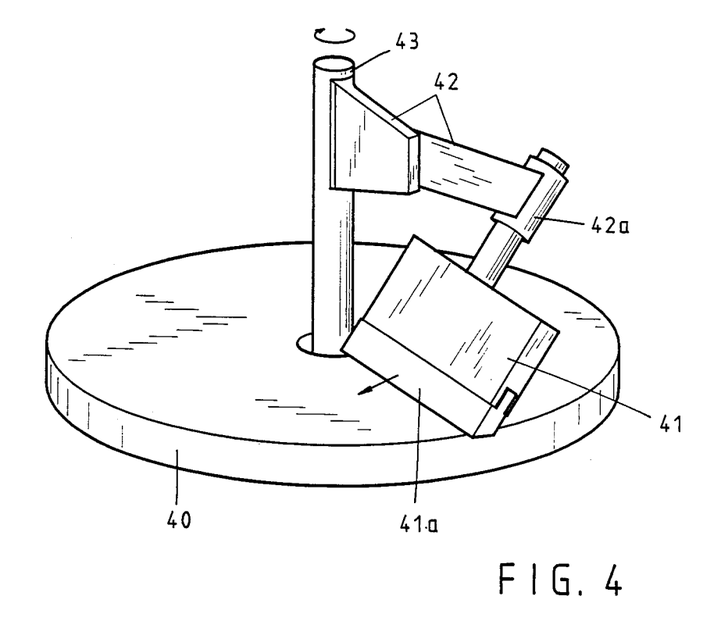
FIG. 4 illustrates a perspective view of a scraper heat exchanger utilized in the apparatus of the invention.

The production of primary ice is advantageously performed in this embodiment by means of the scraper heat exchanger 40–43 (constructed, for example, as described in U.S. Pat. No. 2,299,414) in the lower part of the counterflow washer 31. As indicated in FIG. 2, the scraper heat exchanger has a cooled heat exchanger plate 40, to which coolant is fed through a union 45. The coolant evaporated in the heat exchanger is returned by a union 46 to the suction side of the refrigerator (not shown). The plate 40 is immersed in the ice suspension supplied by the pump 34 from the bottom chamber 4 via the separator 28. As shown in FIG. 4, the heat exchanger has a scraper 41 urged by its own weight onto the plate 40, a scraper blade 41a, for example of abrasion-resistant synthetic plastics, a support 42 for the scraper 41, and a drive shaft 43 connected to the drive motor 44 (FIGS. 2 and 4).

The generation of ice from the aqueous solution with the depressed freezing point produces ice flakes. Such a flake is a fine scale approximately 0.1 mm in thickness and of the order of 1 mm$^2$ in area. The flakes form because, on the one hand, ice crystallizes in the form of small discs due to anisotropic crystal growth, and, on the other hand, the growth in thickness of these discs is very soon interrupted due to increasing concentrations of the freezing-point-depressing substance in the interstices between adjacent growing ice crystals.

The ice flakes which are produced can be stripped off the heat exchanger surface relatively easily. Because their specific gravity is lower than that of the solution, the flakes float spontaneously upwards out of range of the heat exchanger surfaces.

The generation of primary ice is also utilized for the separation of the ethanol. Because ethanol is not incorporated in the ice crystals, the separations can take place through washing, by means of the counterflow washer 31 in the present embodiment.

Alternatively, the primary ice suspension may be produced only to a small extent by means of a scraper heat exchanger with most of the suspension being obtained by freeze drying of the condensate. In this case, the corresponding quantity of condensate can be fed into the chamber 2 by a separate duct, and the resulting ice suspension can be drawn from the chamber 2 by a separate discharge duct. During this freeze drying, partial separation of ethanol occurs before the primary ice is supplied to the counterflow washer 31.

The ethanol from some of the condensate is separated in the vapor generator 30. The ethanol-containing condensate extracted in the separator 28 is heated in the counterflow heat exchanger 32 and evaporated in the vapor generator 30, which is in the form of a falling film evaporator and is heated with compressed coolant vapor delivered via a supply duct 47 and discharged via a discharge duct 48. The evaporated condensate then forms the ethanol-rich propelling vapor for the vapor jet compressors.

The need to separate the ethanol from the condensate determines the quality of primary ice to be generated. The condensate, which is reduced by the proportion fed to the vapor generator 30, and the washing water required in the counterflow washer 31 together determine the quantity of primary ice.

Figure 3:
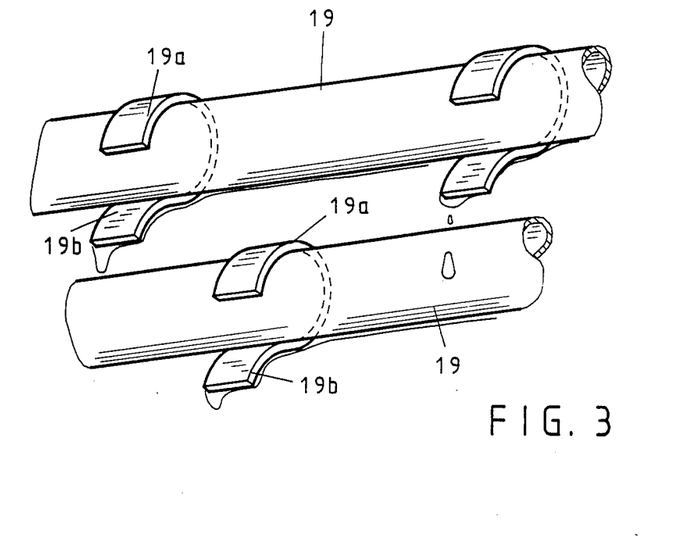
FIG. 3 illustrates a part perspective view of a heat exchanger surface employed in the apparatus in accordance with the invention.

To minimize or even eliminate supercooling of the condensate produced in the chamber 3, it is advantageous to solder onto the tubes 19 of the condenser-/evaporator, at intervals, hooks 19a with downwardly directed tongues 19b from which the supercooled condensate can flow (FIG. 3). By this means, the film thickness of the condensate on the tube surfaces can be kept low, so that the temperature difference from the tube surface to the film surface can be reduced. It is also important for the condenser tubes 19 and hooks 19a to be so arranged that the condensate dripping off does not come into contact again with a condenser surface.

The water low in ethanol leaving the bottom of the vapor generator 30 is cooled in the counterflow heat exchanger 32 and mixed with the suspension of primary ice leaving the upper part of the counterflow washer 31.

In chamber 2, secondary ice generation takes place, that is, the principal ice generation by crystal growth with freeze drying at the triple point by enlargement both of the primary ice crystals and of the recirculated, secondary ice crystals.

The secondary ice recirculated by the pump 35 is mixed with the washed primary ice and fed to the upper part of the chamber 2. The ice content of this suspension is, for example, 15%.

The greater the particle density of the suspended ice crystals, the greater is the vapor pressure during freeze drying. The vapor pressure in the chamber 2 should be as high as possible, as indicated above, to minimize the compression ratio of chamber 3 to chamber 2. To achieve high particle density of the ice crystals in chamber 2, primary ice crystals are fed continuously to chamber 2.

Some of the ice crystal suspension arising in chamber 2, with an ice content of for example 20%, is extracted from the ice generator 1 through the outlet 17 and mixed with the feed water supplied to the plant through a duct 51.

The mobile suspension is supplied through the duct 52 by means of the pump 36 to the dewatering device 33 for processing into a product.

While the separated water serves both as washing water in the counterflow washer 31 and as carrier water for the washed primary ice, the end product, for example a 50% ice crystal slurry, can be passed through a duct 53 for use or further processing.

As indicated in FIG. 2, a supply line 54 for making up ethanol losses communicates with the vapor generator 30.

Figure 5:
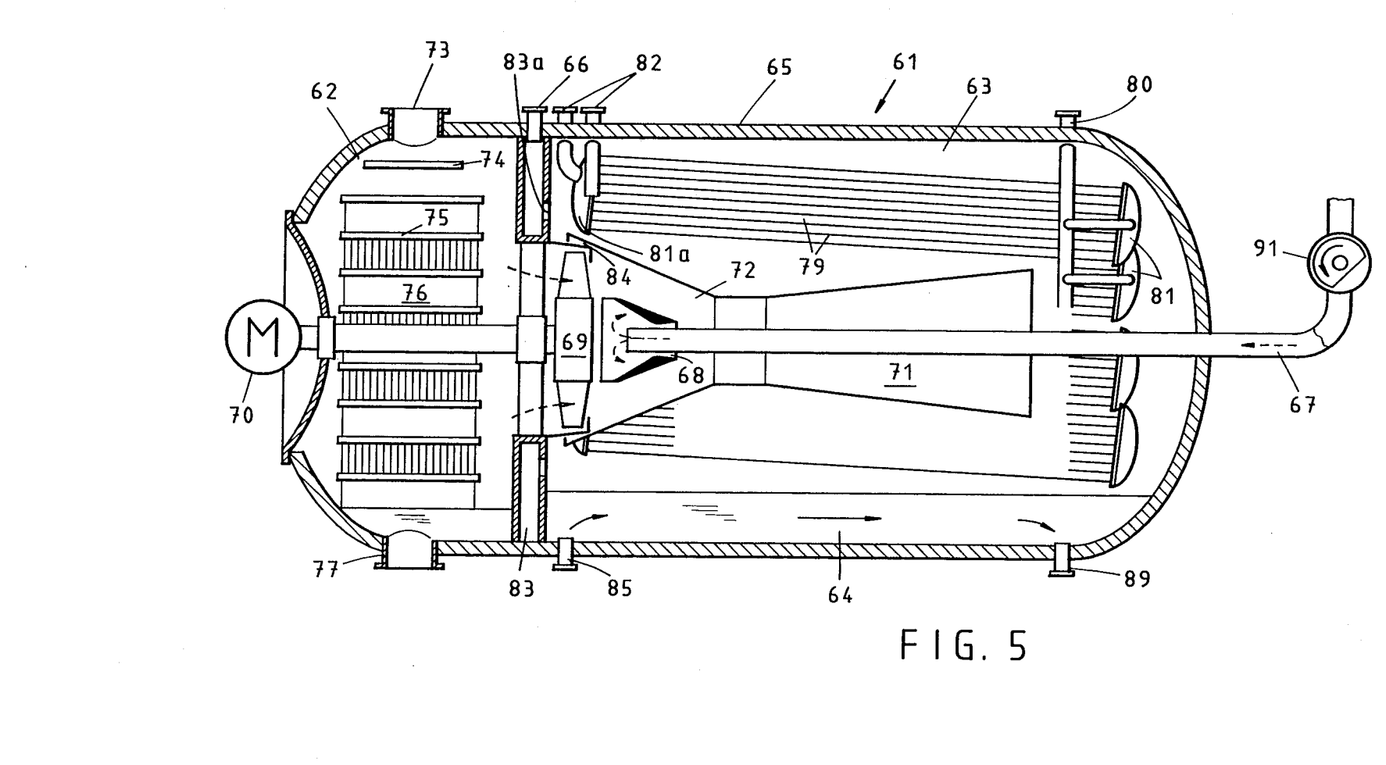
FIG. 5 schematically illustrates a modified apparatus in accordance with the invention.

Referring to FIG. 5, the ice generator 61 is constructed with a freeze drying chamber 62 and a condensation chamber 63 in horizontally disposed relation and a bottom chamber 64 vertically disposed below the condensation chamber 63 within a pressure-resistant casing 65. The casing 65 also has a suction duct 66 for connecting to a vacuum pump (not shown).

The ice generator 61 contains a single-stage axial compressor having an impeller 69 which is driven by a motor 70 in series with a vapor jet compressor having a nozzle 68 and a mixing chamber 72. As indicated, the two compressors have a common diffuser 71.

A distributor 74 is arranged in the freeze drying chamber 62 for recirculated ice crystal suspension. In order to guide this suspension, grilles 75 are provided below the distributor 74. The ice crystal suspension falls free in sheet form 76 over the grilles 75 during operation as indicated. The lower part of the chamber 62 is also provided with an outlet spigot 77, for the suspension.

The condensation chamber 63 houses an immersed condenser/evaporator having a plurality of tubes 79 which are combined to form banks with coolant distributors 81 and collectors 81a. These tubes 79 rise gently in the direction of flow so that the buoyancy of the vapor bubbles can be exploited to assist the flow of coolant.

The coolant is fed to the individual coolant distributors 81 during operation by way of an inlet union 80. The partly evaporated coolant is passed from the collectors 81a separately for each bank of tubes 79 to the suction side of a refrigerator via unions 82 only two of which are shown.

The chambers 62, 63 are divided by a partition 83 which is hollow and contains apertures 83a. During operation, inert gases, more particularly air, brought into the plant by the feed water are drawn off through the apertures 83a, hollow partition 83 and duct 66 by a vacuum pump (not shown).

The condensation chamber 63 is connected to the mixing chamber 72 by a nozzle-like annular duct 84. Through this, the vapor which is enriched with additive (for example ethanol) in the chamber 63 during operation is recirculated.

A union 85 supplies primary ice suspension to the bottom chamber 64 of the ice generator 1 while an outlet union 89 discharges ice suspension from the bottom chamber 64. The ice generator is connected, as in the first embodiment, to a product circulation circuit and a coolant circulation circuit.

During operation, the plant operates as follows. The water vapor arising during freeze drying in the chamber 62 is compressed in the axial compressor consisting of the axial compressor impeller 69 and diffuser 71. An additional contribution to compression of the vapor comes from the vapor jet compressor 68, 71 which is connected in series. The propelling medium is vapor from a vapor generator, supplied through a duct 67 to the ice generator 61. This vapor is enriched with an additive, for example ethanol. In the mixing chamber 72, the propelling vapor is mixed with the vapor from the chamber 62 and the additive-rich vapor flowing through the annular duct 84.

The pressure ratios in the chambers 62, 63 and 64 are as given for the first embodiment (FIGS. 1a to 2).

The vapor mixture flowing around the tubes 79 in the chamber 63 is partly condensed on the external surfaces of the tubes 79 by heat exchange with coolant flowing through the tubes 79. During condensation of the vapor mixture on the external surfaces of the tubes, "primary ice" forms. To avoid repetition, for the physical processes taking place in the chambers 63, 64 reference is made to the corresponding passages relating to the first embodiment.

In the present case, it is at first assumed that a rotary valve 91 in the duct 67 is open throughout operation. The vapor mixture arising in the chamber 63 thus is enriched with additive on the flow path to the annular duct 84.

The condensate collecting in the bottom chamber 64 is fed through a union 89 to a scraper heat exchanger (not shown) similar to the scraper heat exchanger 40/44 in FIG. 2. If the condensation process is to take place in the supercooled range, some of the primary ice suspension from the scraper heat exchanger is returned through the union 85 into the bottom chamber 64 as in FIG. 2. As in the first embodiment, the ethanol-rich primary ice crystal suspension can be largely freed of additive, partly by evaporation and partly by washing. This primary ice is then sent for freeze drying in the chamber 62, so producing ethanol-depleted secondary ice.

Finally, the case will be discussed in which additive is admixed only intermittently. For this purpose, the rotary valve 91 is opened periodically, and the vapor jet compressor is thus brought into operation periodically.

Figure 6:
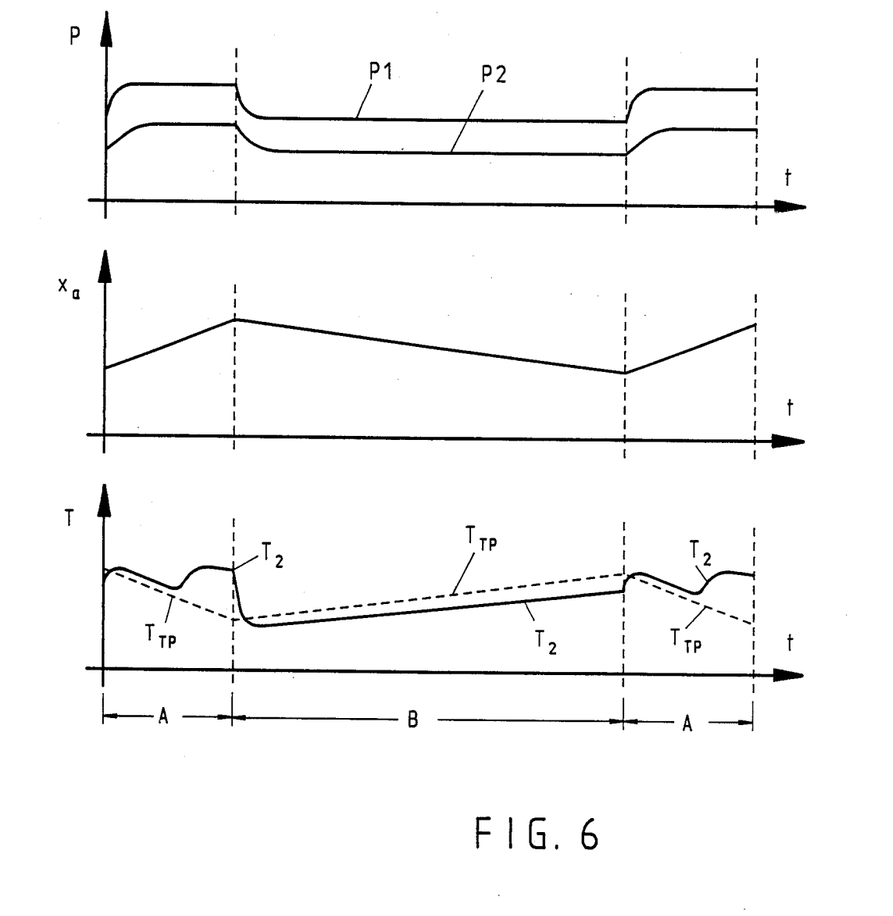
FIG. 6 graphically illustrates a mode of operation of the apparatus of FIG. 5.

FIG. 6 illustrates, in three diagrams, the changes in the pressure, the quantity of additive and the temperature in the chamber 63 over the time t during three phases A, B, A.

P1 is the pressure of the compressed vapor, P2 the vapor pressure on the surface of the condensate, Xa the mole fraction of the additive in the condensate, T2 the temperature of the condensate on the surface, and TTP the triple point temperature.

The vapor jet compressor is on in phase A and off in phase B. The condensation process occurs during phase B in the supercooled range. Supercooling, which at first is far below the critical value, increases with the increasing depletion of additive in the chamber 63. Phase B ends when the supercooling has reached the critical value and ice begins to form spontaneously at isolated places on the condenser tubes 79.

During subsequent phase A, the vapor pressure in the chamber 63 is so high that the ice formed at the end of phase B can melt off again. The condensate temperature T2 is at first substantially equal to the triple point temperature TTP, and finally, when the ice has melted, rises above TTP. The additive is fed into the chamber 63 during phase A with the propelling jet for the vapor jet compressor.

The vapor mixture from the duct 7 functions as a propelling agent which, at first, by mixing, accelerates the mixture supplied from the hollow partition 26 by way of the duct 24. The resulting vapor jets then act as propelling jets for the low pressure vapor delivered from the freeze drying chamber 2.

Where ethanol is used as the additive, the vapor pressure of the mixture at the triple point is reduced, for example, to 5.9 mbar which is below the vapor pressure of pure water (6.1 mbar).

The invention thus provides a relatively simple method and apparatus for generating an ice crystal suspension by freeze drying at the triple point without defrosting being required.

Further, the invention provides a relatively simple method and apparatus for generating ice without the formation of ice by desublimation.

The invention further provides a method of generating an ice crystal suspension which does not require interruptions for defrosting.

Further, the invention provides a relatively economical system for obtaining ice crystal suspensions for large volume flows, for example, for use as air conditioning in mines.

What is claimed is:

1. A method of freeze drying comprising the steps of
   compressing a flow of mixture of water vapor and a water-soluble additive having a lower boiling point than water and which effects the reduction in the vapor pressure of an aqueous solution to the triple point of pure water;
   cooling the compressed mixture in indirect heat exchange relation with a coolant to continuously condense the mixture to form a condensate;
   partially freezing the condensate to form a primary ice crystal suspension while separating additive therefrom; and
   thereafter freeze drying the primary ice crystal suspension to form a secondary ice suspension for processing into a product.

2. A method as set forth in claim 1 wherein the additive is admixed with the water vapor intermittently.

3. A method as set forth in claim 1 wherein the additive is ethanol.

4. A method as set forth in claim 1 wherein the separated additive is re-cycled into the flow of water vapor and additive prior to compression thereof.

5. An apparatus for generating an ice crystal suspension comprising
   a first chamber having heat transfer surfaces therein for receiving a flow of a mixture of compressed water vapor and a water-soluble additive having a lower boiling point than water in indirect heat exchange relation with a flow of coolant to condense the mixture thereon;
   at least one compressor for compressing and delivering the mixture of water vapor and additive into said first chamber;
   a second chamber connected to said first chamber to collect condensate from said first chamber therein;
   means connected in series with said second chamber for receiving the condensate and generating primary ice crystals from the condensate; and
   a third chamber for receiving and freeze drying the primary ice crystals in heat exchange relation with the compressed mixture to generate an ice crystal suspension therefrom.

6. An apparatus as set forth in claim 5 which comprises a plurality of compressors disposed in parallel relation for delivering the compressed mixture to said first chamber.

7. An apparatus as set forth in claim 5 which further comprises a casing enclosing said chambers with said first and third chambers disposed horizontally beside one another and said second chamber disposed below said first chamber.

8. An apparatus as set forth in claim 5 wherein said compressor is a vapor jet compressor.

9. An apparatus as set forth in claim 5 wherein said compressor is an axial compressor.

10. An apparatus as set forth in claim 9 which further comprises a vapor jet compressor in series with said axial compressor.

11. An apparatus as set forth in claim 10 further comprising
    a separator connected to an outlet of said second chamber to separate condensate from the ice crystal suspension;
    a counterflow washer communicating with said separator to receiving a flow of ice crystal suspension therefrom and having an upper end communicating with said third chamber to deliver a flow of primary ice crystals thereto;
    a vapor generating communicating with said separator to receive and evaporate a flow of additive-containing condensate therefrom and communicating with said compressor to deliver a flow of additive-containing water vapor thereto; and
    a supply duct communicating said scraper heat exchanger with an inlet to said second chamber for conveying a flow of ice crystal suspension into said second chamber.

12. An apparatus as set forth in claim 5 wherein said means is a scraper heat exchanger.

13. An apparatus as set forth in claim 11 wherein said scraper heat exchanger is disposed in a bottom end of said counterflow washer.

14. An apparatus as set forth in claim 11 which further comprises a dewatering unit communicating with said third chamber to receive a flow of ice crystal suspension therefrom and communicating with said washer to deliver a flow of separated water thereto, a discharge duct between said third chamber and said dewatering unit to deliver the ice crystal suspension to said unit, a feed duct connected to said latter discharge duct to supply water thereto and a discharge duct extending from said unit to deliver a thickened ice crystal suspension therefrom.

15. An apparatus as set forth in claim 11 which further comprises a discharge duct connected to a lower portion of said third chamber to return at least some of the crystal suspension to an upper portion of said third chamber.

16. An apparatus as set forth in claim 11 further comprising a second supply duct between said vapor generator and said compressor for delivering the flow of additive-containing water vapor to said compressor and a controllable closure member in said second supply duct.

17. An apparatus for generating an ice crystal suspension comprising a freeze-drying chamber;

at least one compressor for delivering a compressed flow of water vapor and a water-soluble additive having a lower boiling point than water into said chamber;

a mixing tube within said chamber for receiving and mixing the compressed flow from said compressor and water vapor from within said chamber;

a condensation chamber having heat transfer surfaces therein for receiving the mixture of compressed water vapor and a additive in indirect heat exchange relation with a flow of coolant to condense the mixture thereon;

a bottom chamber connected to said condensation chamber to collect condensate from said condensation chamber; and means connected in series with said bottom chamber for receiving the condensate and generating primary ice crystals from the condensate, and connected to said freeze-drying chamber to deliver a flow of primary ice crystals thereto for heat exchange with the compressed flow to generate an ice crystal suspension.

18. An apparatus as set forth in claim 17 which further comprised a counterflow washer connected between said means and said drying chamber to separate additive from a flow of primary ice crystals.

* * * * *

UNITED STATES PATENT AND TRADEMARK OFFICE
CERTIFICATE OF CORRECTION

PATENT NO. : 4,749,394

DATED : June 7, 1988

INVENTOR(S) : Christian Ehrsam

It is certified that error appears in the above-identified patent and that said Letters Patent is hereby corrected as shown below:

```
Col. 2,  line 36 "flow primary" should be -flow of primary-
Col. 2,  line 39 "communications" should be -communicates-
Col. 2,  line 55 "films forming" should be - film-forming-
Col. 4,  line 49 "1.1" should be -1:1-
Col. 5,  line 30 "1.1" should be -1:1-
Col. 5,  line 28 "need" should be -needed-
Col. 10, line 37 "to" should be -for-
Col. 10, line 41 "generating" should be -generator-
Col. 12, line 3 "a" should be -an-
Col. 12, line 17 "comprised" should be -comprises-
```

Signed and Sealed this

Twenty-ninth Day of November, 1988

Attest:

DONALD J. QUIGG

Attesting Officer

Commissioner of Patents and Trademarks